United States Patent
Prissok et al.

(10) Patent No.: US 10,165,823 B2
(45) Date of Patent: *Jan. 1, 2019

(54) DAMPING ELEMENT IN SHOE SOLES

(71) Applicant: BASF SE, Ludwigshafen (DE)

(72) Inventors: Frank Prissok, Lemfoerde (DE); Andre Kamm, Bohmte (DE); Bin-Eric Chen, Shanghai (CN); Yoke Khim Raymond Toh, Singapore (SG)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/834,725

(22) Filed: Dec. 7, 2017

(65) Prior Publication Data
US 2018/0103718 A1    Apr. 19, 2018

Related U.S. Application Data

(63) Continuation of application No. 13/884,135, filed as application No. PCT/EP2011/069992 on Nov. 14, 2011, now Pat. No. 9,894,957.

(30) Foreign Application Priority Data

Nov. 16, 2010 (WO) ................ PCT/CN2010/078793

(51) Int. Cl.
| | |
|---|---|
| C08G 18/66 | (2006.01) |
| A43B 13/04 | (2006.01) |
| B29D 35/00 | (2010.01) |
| C08G 18/10 | (2006.01) |
| C08G 18/48 | (2006.01) |
| C08J 9/12 | (2006.01) |
| C08J 9/35 | (2006.01) |
| A43B 13/18 | (2006.01) |
| B29C 44/12 | (2006.01) |
| B29L 31/50 | (2006.01) |

(52) U.S. Cl.
CPC .............. *A43B 13/04* (2013.01); *A43B 13/18* (2013.01); *B29C 44/1285* (2013.01); *B29D 35/00* (2013.01); *B29D 35/0009* (2013.01); *C08G 18/10* (2013.01); *C08G 18/4854* (2013.01); *C08G 18/664* (2013.01); *C08G 18/6674* (2013.01); *C08J 9/12* (2013.01); *C08J 9/35* (2013.01); *B29L 2031/50* (2013.01); *C08G 2350/00* (2013.01); *C08G 2410/00* (2013.01); *C08J 2375/04* (2013.01); *C08J 2475/04* (2013.01)

(58) Field of Classification Search
CPC ... C08J 9/12; C08J 9/35; C08J 2475/04; C08J 2475/08; C08J 2205/05; C08J 2205/052; C08J 2205/06; C08J 2205/08; C08J 2300/22; C08J 2375/04; C08J 2375/08; C08G 18/10; C08G 18/6674; C08G 18/664; C08G 18/6696; C08G 18/4854; C08G 2350/00; C08G 2410/00; A43B 13/04; A43B 13/18; B29C 44/1285; B29C 35/0009; B29D 35/00; B29L 2031/50

See application file for complete search history.

(56) References Cited

U.S. PATENT DOCUMENTS

| | | |
|---|---|---|
| 3,304,273 A | 2/1967 | Stamberger |
| 3,383,351 A | 5/1968 | Stamberger |
| 3,523,093 A | 8/1970 | Stamberger |
| 4,502,234 A | 3/1985 | Schaefer et al. |
| 4,510,702 A | 4/1985 | Ehrlich, Jr. |
| 4,764,537 A | 8/1988 | Horn et al. |
| 6,528,140 B1 | 3/2003 | Kalin et al. |
| 6,762,243 B2 | 7/2004 | Stender et al. |
| 2001/0031797 A1 | 10/2001 | Kuwamura et al. |
| 2001/0047047 A1 | 11/2001 | Nowak et al. |
| 2004/0039146 A1 | 2/2004 | Shidaker et al. |
| 2006/0035990 A1 | 2/2006 | Hennington et al. |
| 2010/0047550 A1 | 2/2010 | Prissok et al. |
| 2014/0017450 A1 | 1/2014 | Baghdadi et al. |

FOREIGN PATENT DOCUMENTS

| | | |
|---|---|---|
| DE | 111394 | 7/1899 |
| DE | 1152 536 | 8/1963 |
| DE | 1152 537 | 8/1963 |
| DE | 36 07 447 | 9/1987 |
| DE | 10 2008 054 962 | 6/2009 |
| EP | 0 153 639 | 9/1985 |
| EP | 0 250 351 | 12/1987 |
| WO | 94 20568 | 9/1994 |
| WO | 2005 098763 | 10/2005 |
| WO | 2007 082838 | 7/2007 |
| WO | 2008 087078 | 7/2008 |

OTHER PUBLICATIONS

International Search Report dated Feb. 16, 2012 in PCT/EP11/69992 Filed Nov. 14, 2011.

*Primary Examiner* — John M Cooney
(74) *Attorney, Agent, or Firm* — Oblon, McClelland, Maier & Neustadt, L.L.P.

(57) ABSTRACT

A process for producing a shoe sole, having a hybrid material of a polyurethane foam as a matrix material and an inlay component of expanded particles of a thermoplastic polyurethane is provided. The process includes preparing an inlay form by joining the expanded particles of a thermoplastic polyurethane in an amount and size of the desired inlay; preparing the shoe sole by placing the prepared inlay form in a shoe sole mold such that an edge of the inlay component is 0.2 cm or more from an edge of the shoe sole mold; embedding the inlay form within a reaction mixture in the shoe sole mold; and reacting the reaction mixture to form the matrix in the shoe sole mold.

8 Claims, No Drawings

DAMPING ELEMENT IN SHOE SOLES

CROSS REFERENCE TO RELATED APPLICATIONS

This application is a continuation application of prior U.S. application Ser. No. 13/884,135, filed May 8, 2013, the disclosure of which is incorporated herein by reference in its entirety. U.S. application Ser. No. 13/884,135 is the national stage of PCT/EP2011/069992, filed Nov. 14, 2011, the disclosure of which is incorporated herein by reference in its entirety. The parent application claims priority to PCT/CN2010/078793, filed Nov. 16, 2010, the disclosure of which is incorporated herein by reference in its entirety.

DESCRIPTION

The present invention relates to a process for producing a shoe sole comprising a hybrid material made of a polyurethane foam as matrix material and of foamed particles of thermoplastic polyurethane by preparing an inlay of joined expanded particles (c") of thermoplastic polyurethane and placing the joined expanded particles of thermoplastic polyurethane in a mould and embedding the inlay with a reaction mixture obtainable by mixing (a) polyisocyanates with (b) compounds having hydrogen atoms reactive toward isocyanates, and if appropriate, with (d) chain extenders and/or crosslinking agents, and with (e) catalysts, and with (f) blowing agents, and with (g) further additives and reacting the reaction mixture to give the shoe sole. The present invention further relates to shoe soles, obtainable by such a process.

Elastic polyurethane moldings with compact surface and cellular core, known as flexible integral polyurethane foams, have been known for a long time and are used in various sectors. A typical use is the use as shoe sole, for example for outdoor shoes, sports shoes, sandals, and boots. More particularly, flexible integral polyurethane foams can be used in producing outsoles, mid-soles, insoles and molded soles.

There are also known flexible integral polyurethane foams which comprise particles of foamed thermoplastic polyurethane. These are described by way of example in WO 2008087078. The production process described in WO 2008087078 permits homogeneous distribution of the particles of foamed polyurethane within the matrix material. Advantages of said hybrid materials are very good adhesion between matrix material and the particles of foamed polyurethane, giving the hybrid material good mechanical properties.

In order to increase comfort, damping elements are introduced into shoe soles, in particular in the heel region. These are intended to reduce the load on muscles and joints, and also on the skeleton, during tread impact. Typical damping elements here are air cushions, known as "airbags". The region of the ball and of the toes here does not have cushioning by any airbag. The relatively hard sole material in that region minimizes energy dissipation during lift-off of the foot from the ground, and the sole provides the shoe-wearer with good grip.

A disadvantage of known airbags is that they stiffen the shoe sole, inhibiting the natural rolling movement of the foot.

It was an object of the present invention to provide a shoe sole which has excellent damping properties but is nevertheless highly flexible and thus permits the natural rolling movement of the foot.

This object is achieved via a shoe sole which comprises a hybrid material made of a polyurethane foam as matrix material and of foamed particles of thermoplastic polyurethane, which is obtainably by preparing an inlay of joined expanded particles (c") of thermoplastic polyurethane and placing the joined expanded particles of thermoplastic polyurethane in a mould and embedding the inlay with a reaction mixture obtainable by mixing (a) polyisocyanates with (b) compounds having hydrogen atoms reactive toward isocyanates, and if appropriate, with (d) chain extenders and/or crosslinking agents, and with (e) catalysts, and with (f) blowing agents, and with (g) further additives and reacting the reaction mixture to give the shoe sole.

A further possible process to obtain said shoe sole which comprises a hybrid material made of a polyurethane foam as matrix material and of foamed particles of thermoplastic polyurethane, is by preparing an inlay of joined particles (c') of thermoplastic polyurethane comprising blowing agent and placing the joined expanded particles of thermoplastic polyurethane in a mould and embedding the inlay with a reaction mixture obtainable by mixing (a) polyisocyanates with (b) compounds having hydrogen atoms reactive toward isocyanates, and with (d) chain extenders and/or crosslinking agents, and with (e) catalysts, and with (f) blowing agents, and with (g) further additives and reacting the reaction mixture to give the shoe sole where the expandable particles are synchronously foamed via the heat of reaction produced by the reaction mixture to form expanded particles (c") of thermoplastic polyurethane.

This shoe sole can also have other constituents, for example an outsole, for example made of rubber or of a polyurethane. In one preferred embodiment, the shoe sole is composed of the hybrid material of the invention.

For the purposes of the invention, the mixture of components a) to d) and also, if appropriate, e) to g) here is termed reaction mixture at reaction conversions smaller than 90%, based on the isocyanate groups.

The organic and/or modified polyisocyanates (a) used to produce the composite polyurethane materials of the invention comprise the aliphatic, cycloaliphatic, and aromatic di- or poly-functional isocyanates known from the prior art (constituent a-1), and also any desired mixtures thereof. Examples are diphenylmethane 4,4'-diisocyanate, diphenylmethane 2,4'-diisocyanate, the mixtures of monomeric diphenylmethane diisocyanates with diphenylmethane-diisocyanate homologs having a relatively large number of rings (polymer-MDI), tetramethylene diisocyanate, hexamethylene diisocyanate (HDI), isophorone diisocyanate (IPDI), tolylene 2,4- or 2,6-diisocyanate (TDI), and mixtures of the isocyanates mentioned.

It is preferable to use 4,4'-MDI. The 4,4'-MDI preferably used can comprise from 0 to 20% by weight of 2,4' MDI and small amounts, up to about 10% by weight, of allophanate- or uretonimine-modified polyisocyanates. It is also possible to use small amounts of polyphenylene polymethylene polyisocyanate (polymer-MDI). The total amount of these high-functionality polyisocyanates should not exceed 5% by weight of the isocyanate used.

Polyisocyanate component (a) is preferably used in the form of polyisocyanate prepolymers. These polyisocyanate prepolymers are obtainable by reacting polyisocyanates (a-1) described above with polyols (a-2) to give the prepolymer, for example at temperatures of from 30 to 100° C., preferably at about 80° C.

Polyols (a-2) are known to the person skilled in the art and are described by way of example in "Kunststoffhandbuch

[Plastics handbook], Volume 7, Polyurethane [Polyurethanes]", Carl Hanser Verlag, 3rd Edition 1993, chapter 3.1.

The polyols (a-2) used here preferably comprise the high-molecular-weight compounds described under b) which have hydrogen atoms reactive toward isocyanates.

Conventional chain extenders or crosslinking agents are, if appropriate, added to the polyols mentioned during production of the isocyanate prepolymers. These substances are described under e) below.

Conventional chain extenders or crosslinking agents are, if appropriate, added to the polyols mentioned during production of the isocyanate prepolymers. These substances are described under e) below. The chain extenders or crosslinking agents used particularly preferably comprise dipropylene glycol or tripropylene glycol.

By way of example, relatively high-molecular-weight compounds b) having at least two H atoms reactive toward isocyanate groups can be polyetherols or polyesterols.

Polyetherols are prepared by known processes, for example via anionic polymerization using, as catalysts, alkali metal hydroxides or alkali metal alcoholates, and with addition of at least one starter molecule which comprises from 2 to 3 reactive hydrogen atoms, or via cationic polymerization using Lewis acids, such as antimony pentachloride or boron fluoride etherate, from one or more alkylene oxides having from 2 to 4 carbon atoms in the alkylene radical. Examples of suitable alkylene oxides are tetrahydrofuran, propylene 1,3-oxide, butylene 1,2-oxide, butylene 2,3-oxide, and preferably ethylene oxide and propylene 1,2-oxide. Other catalysts that can be used are multimetal cyanide compounds, known as DMC catalysts. The alkylene oxides can be used individually, in alternating succession, or in the form of a mixture. It is preferable to use mixtures composed of propylene 1,2-oxide and ethylene oxide, where the amounts of ethylene oxide used as ethylene oxide end block (EO cap) are from 10 to 50%, giving the resultant polyols more than 70% of primary OH end groups.

The starter molecule used can comprise water or di- and trihydric alcohols, such as ethylene glycol, 1,2- and 1,3-propanediol, diethylene glycol, dipropylene glycol, 1,4-butanediol, glycerol, or trimethylolpropane.

The functionality of the polyether polyols, preferably polyoxypropylene polyoxyethylene polyols, is from 2 to 3 and their molar masses are from 1000 to 8000 g/mol, preferably from 2000 to 6000 g/mol.

By way of example, polyester polyols can be prepared from organic dicarboxylic acids having from 2 to 12 carbon atoms, preferably from aliphatic dicarboxylic acids having from 4 to 6 carbon atoms, and from polyhydric alcohols, preferably diols, having from 2 to 12 carbon atoms, preferably from 2 to 6 carbon atoms. Examples of dicarboxylic acids that can be used are: succinic acid, glutaric acid, adipic acid, suberic acid, azelaic acid, sebacic acid, decanedicarboxylic acid, maleic acid, fumaric acid, phthalic acid, isophthalic acid, and terephthalic acid. The dicarboxylic acids here can be used either individually or else in a mixture with one another. Instead of the free dicarboxylic acids, it is also possible to use the corresponding dicarboxylic acid derivatives, e.g. dicarboxylic esters of alcohols having from 1 to 4 carbon atoms, or dicarboxylic anhydrides. It is preferable to use dicarboxylic acid mixtures composed of succinic, glutaric, and adipic acid in quantitative proportions of, for example, from 20 to 35: from 35 to 50: from 20 to 32 parts by weight, and in particular adipic acid. Examples of di- and polyhydric alcohols, in particular diols, are: ethanediol, diethylene glycol, 1,2- or 1,3-propanediol, dipropylene glycol, 1,4-butanediol, 1,5-pentanediol, 1,6-hexanediol, 1,10-decanediol, glycerol, and trimethylolpropane. It is preferable to use ethanediol, diethylene glycol, 1,4-butanediol, 1,5-pentanediol, and 1,6-hexanediol. It is also possible to use polyester polyols derived from lactones, e.g. ε-caprolactone, or hydroxycarboxylic acids, e.g. ω-hydroxycaproic acid.

For preparation of the polyester polyols, the organic, e.g. aromatic, and preferably aliphatic, polycarboxylic acids and/or their derivatives and polyhydric alcohols can be polycondensed without a catalyst or preferably in the presence of esterification catalysts, advantageously in an atmosphere composed of inert gas, for example nitrogen, carbon monoxide, helium, argon, etc., in the melt at temperatures which are from 150 to 250° C., preferably from 180 to 220° C., if appropriate at reduced pressure, until the desired acid number has been reached, this preferably being smaller than 10, particularly preferably smaller than 2. According to one preferred embodiment, the esterification mixture is polycondensed at the abovementioned temperatures until the acid number is from 80 to 30, preferably from 40 to 30, at atmospheric pressure, and then at a pressure which is smaller than 500 mbar, preferably from 50 to 150 mbar. Examples of esterification catalysts that can be used are iron catalysts, cadmium catalysts, cobalt catalysts, lead catalysts, zinc catalysts, antimony catalysts, magnesium catalysts, titanium catalysts, and tin catalysts, in the form of metals, of metal oxides, or of metal salts. However, the polycondensation process can also be carried out in a liquid phase in the presence of diluents and/or entrainers, e.g. benzene, toluene, xylene, or chlorobenzene, for the azeotropic removal of the water of condensation by distillation. The polyester polyols are advantageously produced by polycondensing the organic polycarboxylic acids and/or polycarboxylic acid derivatives and polyhydric alcohols in a molar ratio of 1:1 to 1.8, preferably 1:1.05 to 1.2.

The functionality of the resultant polyester polyols is preferably from 2 to 4, in particular from 2 to 3, their molar mass being from 480 to 3000 g/mol, preferably from 1000 to 3000 g/mol.

Other suitable polyols are polymer-modified polyols, preferably polymer-modified polyesterols or polyetherols, particularly preferably graft polyetherols or graft polyesterols, in particular graft polyetherols. These are what is known as a polymer polyol, usually having from 5 to 60% by weight, preferably from 10 to 55% by weight, particularly preferably from 30 to 55% by weight, and in particular from 40 to 50% by weight, content of preferably thermoplastic polymers. These polymer polyesterols are described by way of example in WO 05/098763 and EP-A 250 351, and are usually prepared via free-radical polymerization of suitable olefinic monomers, such as styrene, acrylonitrile, (meth)acrylates, (meth)acrylic acid, and/or acrylamide, in a polyesterol serving as graft base. The side chains are generally produced via transfer of the free radicals from growing polymer chains to polyesterols or polyetherols. The polymer polyol comprises, alongside the graft copolymer, mainly the homopolymers of the olefins, dispersed in unaltered polyesterol or polyetherol.

In one preferred embodiment, the monomers used comprise acrylonitrile, styrene, or acrylonitrile and styrene, particularly preferably exclusively styrene. The monomers are, if appropriate, polymerized in the presence of further monomers, of a macromer, and of a moderator, and with use of a free-radical initiator, mostly azo compounds or peroxide compounds, in a polyesterol or polyetherol as continuous phase. This process is described by way of example in DE 111 394, U.S. Pat. No. 3,304,273, U.S. Pat. No. 3,383,351, U.S. Pat. No. 3,523,093, DE 1 152 536, and DE 1 152 537.

During the free-radical polymerization process, the macromers are concomitantly incorporated into the copolymer chain. This gives block copolymers having a polyester or, respectively, polyether block and a polyacrylonitrile-styrene block, where these act as compatibilizers at the interface of continuous phase and disperse phase and suppress agglomeration of the polymer polyesterol particles. The proportion of the macromers is usually from 1 to 20% by weight, based on the total weight of the monomers used to produce the polymer polyol.

If the relatively high-molecular-weight compound b) comprises polymer polyol, it is preferably comprised together with further polyols, e.g. polyetherols, polyesterols, or a mixture of polyetherols and polyesterols. The proportion of polymer polyol is particularly preferably greater than 5% by weight, based on the total weight of component (b). The amount present of the polymer polyols can by way of example be from 7 to 90% by weight, or from 11 to 80% by weight, based on the total weight of component (b). It is particularly preferable that the polymer polyol is polymer polyesterol or polymer polyetherol.

Examples of expandable thermoplastic polyurethane particles (c') that can be used, comprising blowing agents in dispersed or dissolved form, are blowing-agent-impregnated particles of thermoplastic polyurethane. Particles of this type and their production are described by way of example in WO 94/20568, WO 2007/082838, and WO 2008/087078.

For production of the expandable particles (c'), it is particularly preferable to use thermoplastic polyurethanes for which the melting range begins below 130° C., particularly preferably below 120° C., on DSC measurement using a heating rate of 20 K/min, and where the melt flow rate (MFR) of the thermoplastic polyurethane (also termed TPU) at 190° C. and an applied weight of 21.6 kg to DIN EN ISO 1133 is at most 250 g/10 min, particularly preferably being smaller than 200 g/10 min. The average diameter of the thermoplastic polyurethane comprising blowing agent is preferably from 0.1 to 10 mm.

This type of thermoplastic polyurethane is preferably based on a polyalcohol, particularly preferably on polyetherdiol. Polytetrahydrofuran can be used with particular preference here. It is particularly preferable that the TPU is based on polytetrahydrofuran with a molar mass of from 600 g/mol to 2500 g/mol. The polyalcohols can be used either individually or else in a mixture with one another.

As an alternative, good results can be achieved with TPU based on polyester alcohol, preferably polyesterdiol, preferably based on adipic acid and 1,4-butanediol, with a molar mass of from 500 to 2500 g/mol, particularly preferably from 600 g/mol to 900 g/mol.

Thermoplastic polyurethane of the invention is produced by way of example via reaction of isocyanates (c1) with compounds reactive toward isocyanates with a molecular weight of from 500 to 10 000 (c2) and, if appropriate, with chain extenders with a molecular weight of from 50 to 499 (c3), if appropriate in the presence of catalysts (c4) and/or of conventional auxiliaries and/or additives (c5).

The starting materials (c1) to (c5) and the process for producing the expandable particles (c') are known and are described by way of example in WO 94/20568, WO 2007/082838, and WO 2008/087078. It is preferable that the foamed particles are based on a thermoplastic polyurethane produced by using Polytetrahydrofuran as component (c2). The molar mass of the polytetrahydrofuran used is preferably from 600 to 2500 g/mol. In another preferred embodiment, a polyester polyalcohol with molar mass of from 500 to 2500 g/mol, preferably from 600 to 900 g/mol, is used as component (c2).

If the process of the invention for producing the hybrid material of the invention uses previously expanded particles (c") of thermoplastic polyurethane instead of expandable particles (c') of thermoplastic polyurethane, these are preferably obtained via expansion of the expandable particles (c'), for example when the impregnated pellets are depressurized at temperatures above the softening point of the thermoplastic polyurethane during the suspension process, or when discharge from the extruder takes place at atmospheric pressure during the extrusion process.

The foamed particles (c") preferably comprise a diameter from 0.1 mm to 10 cm, preferably from 0.5 mm to 5 cm, and with particular preference from 1 mm to 2 cm, and they are preferably spherical or ellipsoid. In the case of non-spherical particles, for example elliptical particles, diameter means the longest axis. The density of the foamed particles of thermoplastic polyurethane here is preferably from 10 to 300 g/L, particularly preferably from 20 to 200 g/L, and more particularly from 40 to 150 g/L.

It is preferable that the foamed particles have a compact exterior skin. A compact skin means here that the foam cells are smaller in the exterior region of the foamed particles than in their interior. It is particularly preferable that the exterior region of the foamed particles comprises no pores.

According to the present invention the expandable particles (c') or the expanded particles (c") are bonded together to form an inlay. This bonding can by way of example be achieved via introduction of the particles (c') or (c") into a bag, preferably made of a material which is rarely permeable to the constituents of the resultant matrix material, where the material is impermeable to the expandable particles (c') or the expanded particles (c"), an example being a net. It is preferable that the expandable particles (c') and, respectively, the expanded particles (c") are fixed to one another by way of example via adhesive bonding. For the adhesive bonding al kind of adhesives can be used. Preferably polyurethane based adhesives such as known one component or two component polyurethane binders are used. Appropriate binders and a method of binding particles is for example disclosed in DE 102008054962. In or thermal adhesive bonding. In the thermal adhesive bonding process or melt bonding process here, the exterior region of the foamed particles of thermoplastic polyurethane is heated to the extent that the foamed particles adhere to one another after they have been brought into contact and then recooled. This process can by way of example take place in a mold, if appropriate during foaming of the expandable particles (c') to give the expanded particles (c").T In the case of large particles here, for example those having a diameter greater than 3 cm, e.g. from 4 to 6 cm, it is also possible to use only one particle as inlay. The shape of this particle can by way of example correspond to that of a conventional "airbag". Under these circumstances an inlay of joined expanded particles (c") includes also an inlay of one expanded particle (c").

In a preferred embodiment expanded particles are bonded together to form an inlay, preferably by adhesive bonding.

The inlays are produced ether by joining the expandable particles (c') or the expanded particles (c") in an amount and size of the desired inlay, for example by placing them into a mould of the desired size and joining them within the mould or by joining them in larger amounts to form large aggregates for example in form of sheets. These large aggregates than can be cut to inlays of the desired size.

Blowing agents (d) are also present as matrix material during the production of polyurethane foams. These blowing agents comprise water where appropriate. Blowing agents (d) that can be used are not only water but also well known compounds having chemical and/or physical action. Chemical blowing agents are compounds which form gaseous products via reaction with isocyanate, an example being formic acid. Physical blowing agents are compounds which have been dissolved or emulsified within the starting materials for polyurethane production and which vaporize under the conditions of polyurethane formation. By way of example, these are hydrocarbons, halogenated hydrocarbons, and other compounds, e.g. perfluorinated alkanes, such as perfluorohexane, fluorochlorocarbons, and ethers, esters, ketones, and/or acetals, examples being (cyclo)aliphatic hydrocarbons having from 4 to 8 carbon atoms, or fluorocarbons, such as Solkane® 365 mfc. In one preferred embodiment, the blowing agent used comprises a mixture of said blowing agents, comprising water, and in particular is water as sole blowing agent. If no water is used as blowing agent, it is preferable to use exclusively physical blowing agents.

The content of water in one preferred embodiment is from 0.1 to 2% by weight, preferably from 0.2 to 1.5% by weight, particularly preferably from 0.3 to 1.2% by weight, more particularly from 0.4 to 1% by weight, based on the total weight of components (a) to (g).

In another preferred embodiment, hollow microbeads comprising physical blowing agent are added as additional blowing agent to the reaction of components (a), (b) and, if appropriate, (d). The hollow microbeads can also be used in a mixture with the abovementioned blowing agents.

The hybrid materials of the invention can be produced with or without concomitant use of (e) chain extenders and/or crosslinking agents. However, addition of chain extenders, crosslinking agents or, if appropriate, else a mixture thereof can prove advantageous for modification of mechanical properties, e.g. of hardness. These chain extenders and/or crosslinking agents are substances with a molar mass which is preferably smaller than 400 g/mol, particularly preferably from 60 to 400 g/mol, and chain extenders here have 2 hydrogen atoms reactive toward isocyanates while crosslinking agents have 3 hydrogen atoms reactive toward isocyanate. These can be used individually or in the form of a mixture. It is preferable to use diols and/or triols with molecular weights smaller than 400, particularly preferably from 60 to 300, and more particularly from 60 to 150. Examples of those that can be used are aliphatic, cycloaliphatic, and/or araliphatic diols having from 2 to 14, preferably from 2 to 10, carbon atoms, e.g. ethylene glycol, 1,2-propanediol, 1,3-propanediol, 1,3-butanediol, 1,10-decanediol, o-, m-, or p-dihydroxycyclohexane, diethylene glycol, dipropylene glycol, and preferably 1,4-butanediol, 1,6-hexanediol, and bis(2-hydroxyethyl)hydroquinone, triols, such as 1,2,4- or 1,3,5-trihydroxycyclohexane, glycerol, and trimethylolpropane, and low-molecular-weight polyalkylene oxides which comprise hydroxy groups and are based on ethylene oxide and/or on propylene 1,2-oxide and the abovementioned diols and/or triols as starter molecules.

To the extent that chain extenders, crosslinking agents, or a mixture of these is used, their amounts advantageously used are from 1 to 60% by weight, preferably from 1.5 to 50% by weight, and in particular from 2 to 40% by weight, based on the weight of components (b) and (e).

If catalysts (f) are used for producing the hybrid materials of the invention, it is preferable to use compounds which markedly accelerate the reaction of the compounds of component (b) and, if appropriate, (d) comprising hydroxy groups with the organic, if appropriate modified, polyisocyanates (a). Examples that may be mentioned are amidines, such as 2,3-dimethyl-3,4,5,6-tetrahydropyrimidine, tertiary amines, such as triethylamine, tributylamine, dimethylbenzylamine, N-methyl-, N-ethyl-, or N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane, and preferably 1,4-diazabicyclo[2.2.2]octane, and alkanolamine compounds, such as triethanolamine, triisopropanolamine, N-methyl- and N-ethyldiethanolamine, and dimethylethanolamine. Organometallic compounds can also be used, preferably organotin compounds, such as stannous salts of organic carboxylic acids, e.g. stannous acetate, stannous octoate, stannous ethylhexoate, and stannous laurate, and the dialkyltin(IV) salts of organic carboxylic acids, e.g. dibutyltin diacetate, dibutyltin dilaurate, dibutyltin maleate, and dioctyltin diacetate, and also bismuth carboxylates, such as bismuth(III) neodecanoate, bismuth 2-ethylhexanoate, and bismuth octanoate, or a mixture thereof. The organometallic compounds can be used alone or preferably in combination with strongly basic amines. If component (b) involves an ester, it is preferable to use exclusively amine catalysts.

It is preferable to use from 0.001 to 5% by weight, in particular from 0.05 to 2% by weight, of catalyst or catalyst combination, based on the weight of component (b).

Auxiliaries and/or additives (g) can, if appropriate, also be added to the reaction mixture for production of the hybrid materials of the invention. Examples that may be mentioned are surfactants, foam stabilizers, cell regulators, release agents, fillers, dyes, pigments, hydrolysis stabilizers, odor-absorbent substances, and fungistatic and bacteriostatic substances.

Examples of surfactants that can be used are compounds which serve to promote homogenization of the starting materials and, if appropriate, are also capable of regulating cell structure. Examples that may be mentioned are emulsifiers, such as the sodium salts of castor oil sulfates or of fatty acids, and also salts of fatty acids with amines, e.g. diethylamine oleate, diethanolamine stearate, diethanolamine ricinoleate, salts of sulfonic acids, e.g. the alkali metal or ammonium salts of dodecylbenzene- or dinaphthylmethanedisulfonic acid and ricinoleic acid; foam stabilizers, e.g. siloxane-oxalkylene copolymers and other organopolysiloxanes, ethoxylated alkylphenols, ethoxylated fatty alcohols, paraffin oils, castor oil esters or ricinoleic esters, Turkish red oil and peanut oil, and cell regulators, such as paraffins, fatty alcohols, and dimethylpolysiloxanes. Oligomeric acrylates having, as pendant groups, polyoxyalkylene radicals and fluoroalkane radicals are moreover suitable for improving emulsifying action and cell structure, and/or for stabilizing the foam. The usual amounts used of the surfactants are from 0.01 to 5 parts by weight, based on 100 parts by weight of component (b).

Examples that may be mentioned of suitable release agents are: reaction products of fatty esters with polyisocyanates, salts derived from polysiloxanes comprising amino groups and fatty acids, salts derived from saturated or unsaturated (cyclo)aliphatic carboxylic acids having at least 8 carbon atoms and tertiary amines, and also in particular internal lubricants, e.g. carboxylic esters and/or carboxamides, produced via esterification or amidation of a mixture composed of montanic acid and of at least one aliphatic carboxylic acid having at least 10 carbon atoms with at least dibasic alkanolamines, polyols, and/or polyamines whose molar masses are from 60 to 400 g/mol, as disclosed by way of example in EP-A 153 639, or with a mixture composed of organic amines, metal stearates, and organic mono- and/or dicarboxylic acids or their anhydrides, as disclosed by way of example in DE-A 36 07 447, or a mixture composed of an imino compound, of a metal carboxylate and, if appropriate, of a carboxylic acid, as disclosed by way of example in U.S. Pat. No. 4,764,537.

Fillers, in particular reinforcing fillers, are the usual organic and inorganic fillers, reinforcing agents, weighting agents, agents for improving abrasion behavior in paints, coating agents, etc. that are known per se. Individual fillers that may be mentioned by way of example are: inorganic fillers, such as silicatic minerals, such as phyllosilicates, e.g. antigorite, bentonite, serpentine, hornblendes, amphiboles, chrysotile, and talc, metal oxides, e.g. kaolin, aluminum oxides, titanium oxides, zinc oxide, and iron oxides, metal salts, e.g. chalk and baryte, and inorganic pigments, e.g. cadmium sulfide, and zinc sulfide, and also glass, etc. It is preferable to use kaolin (China clay), aluminum silicate, and coprecipitates made of barium sulfate and aluminum silicate, or else natural or synthetic fibrous mineral-like materials, e.g. wollastonite, metal fibers, and in particular glass fibers, of varying length, which may, if appropriate, have been treated with a size. Examples of organic fillers that can be used are: carbon black, melamine, colophony, cyclopentadienyl resins, and graft polymers, and also cellulose fibers, polyamide fibers, polyacrylonitrile fibers, polyurethane fibers, and polyester fibers, where these are based on aromatic and/or aliphatic dicarboxylic esters, and in particular carbon fibers.

The inorganic and organic fillers can be used individually or in the form of a mixture, and the amounts of these advantageously added to the reaction mixture are from 0.5 to 50% by weight, preferably from 1 to 40% by weight, based on the weight of components (a) to (c), where the content of matts, nonwovens, and textiles made of natural and synthetic fibers can, however, reach values up to 80% by weight.

The hybrid materials of the invention are produced by a known process. For this, the polyisocyanates (a) are reacted with the compounds (b) having hydrogen atoms reactive toward isocyanates, and with blowing agents (d), and with the expandable particles of thermoplastic polyurethane (c') which comprise blowing agents in dispersed or dissolved form, or with the expanded particles of thermoplastic polyurethane (c''), blowing agent (d), and also, if appropriate, with chain extenders and/or crosslinking agents (e), and with catalysts (f), and with the further additives (g), in amounts such that the equivalent ratio of NCO groups of the polyisocyanates (a) to the entirety of the reactive hydrogen atoms of components (b) and, if present, (d) and (f) is from 1:0.8 to 1:1.25, preferably from 1:0.9 to 1:1.15. It is also possible here to use components (c') or, respectively, (c'') as initial charge in a mold and to add the reaction mixture comprising components a), b), d) and, if appropriate, (e) to (g) to the mold.

The particles of expanded thermoplastic polyurethane (c'') adhesive-bonded to one another to form an inlay, can then be inserted for example into the heel region or the toe region, preferably into the heel region of a mold for producing shoe soles. The procedure for this is analogous to the conventional process using the known "airbag".

The hybrid materials of the invention are preferably produced by the one-shot process with the aid of low- or high-pressure technology, in closed, advantageously temperature-controlled molds. The molds are usually composed of metal, e.g. aluminum or steel. These procedures are described by way of example by Piechota and Rohr in "Integralschaumstoff" [Integral foam], Carl-Hanser-Verlag, Munich, Vienna, 1975, or in "Kunststoffhandbuch", Band 7, Polyurethane [Plastics handbook, volume 7, Polyurethanes], 3rd edition, 1993, chapter 7.

For this, the starting components are mixed at a temperature of from 15 to 90° C., preferably from 20 to 35° C., and if appropriate introduced at elevated pressure into the closed mold. The mixing can be carried out mechanically by means of a stirrer or agitator screw, or at high pressure in what is known as the countercurrent injection process. The temperature of the mold is advantageously from 20 to 90° C., preferably from 30 to 60° C.

The amount of the reaction mixture introduced into the mold is judged in such a way that the density of the resultant integral foam moldings is from 0.08 to 0.70 g/cm$^3$, in particular from 0.12 to 0.60 g/cm$^3$. The degrees of compaction for producing the moldings with compacted edge zone and cellular core are in the range from 1.1 to 8.5, preferably from 2.1 to 7.0.

The matrix material used here preferably comprises a polyurethane material which is conventionally used in shoe soles. More particularly, this is a flexible integral polyurethane foam. Flexible integral polyurethane foams are polyurethane foams to DIN 7726 with cellular core and compact surface, where the shaping process gives the edge zone a higher density than the core. The foamed particles of thermoplastic polyurethane here can, more particularly at the upper and lower side of the shoe sole, extend as far as the surface of the flexible integral polyurethane foam. The tensile strengths of a polyurethane shoe sole of the invention are preferably from 0.5 to 10 N/mm$^2$, and with particular preference from 1 to 5 N/mm$^2$, measured to DIN 53504. The elongation of the shoe sole of the invention is moreover from 100 to 800%, preferably from 180 to 500%, measured to DIN 53504. The rebound resilience of the shoe sole of the invention to DIN 53 512 is moreover preferably from 10 to 60%. Finally, the tear-propagation resistance of the shoe sole of the invention is preferably from 0.5 to 10 N/mm, and preferably from 1.0 to 4 N/mm, measured to ASTM D3574. In the region of the foamed particles of thermoplastic polyurethane (c''), the elasticity of the shoe sole of the invention is higher, and its rebound value is better, than in the rest of the sole.

The density of the matrix material is preferably from 100 to 800 g/l, particularly preferably from 150 to 600 g/l, and more particularly from 200 to 500 g/L, where the density of the foamed particles of thermoplastic material is preferably smaller than the density of the matrix material.

Preferably the ball and toe region of the shoe sole of the invention is in essence free from foamed particles of thermoplastic polyurethane or portions of foamed particles of thermoplastic polyurethane. The shoe sole here is divided into two halves of equal length along a line between the rear end (heel) and frontal end (toe) of the sole. For the purposes of the invention, everything within the rear portion of the sole is termed the heel region, and everything within the frontal portion of the sole is termed the ball and toe region. The heel region preferably means the rear third of the sole, and the ball and toe region preferably means the frontal third of the sole, in each case based on the length of the sole.

Furthermore, preferably the exterior edge of the heel region is also in essence free from foamed particles of thermoplastic polyurethane or portions of foamed particles of thermoplastic polyurethane in a region of at least 0.2 cm, preferably of from at least 0.3 to at most 5.0 cm, particularly preferably from at least 0.5 to at most 3.0 cm, based in each case on the distance from the exterior edge of the sole. "Exterior edge of the sole" here does not mean the upper or lower side of the sole.

"In essence free" means here that the amount of foamed particles of thermoplastic polyurethane comprised in said region of the sole is less than 5% by weight, preferably less than 2% by weight, particularly preferably less than 1% by weight, and more particularly less than 0.5% by weight.

The height of that region of the sole in which the foamed particles of thermoplastic polyurethane are found depends on the height of the sole in said region. It is preferable that the matrix material completely surrounds the foamed particles of TPU, but this can extend as far as the surface.

The foamed particles here are composed of a foamed thermoplastic polyurethane material. The diameter of said foamed particles is preferably from 0.1 mm to 10 cm, preferably from 0.5 mm to 5 cm, and with particular preference from 1 mm to 2 cm, and they are preferably spherical or ellipsoid. In the case of non-spherical particles, for example elliptical particles, diameter means the longest axis. The density of the foamed particles of thermoplastic polyurethane here is preferably from 10 to 300 g/L, particularly preferably from 20 to 200 g/L, and more particularly from 40 to 150 g/L. In the case of large particles here, for example those having a diameter greater than 3 cm, e.g. from 4 to 6 cm, it is also possible to use only one particle. The shape of this can by way of example correspond to that of a conventional "airbag".

It is preferable that the foamed particles have a compact exterior skin. A compact skin means here that the foam cells are smaller in the exterior region of the foamed particles than in their interior. It is particularly preferable that the exterior region of the foamed particles comprises no pores.

It is preferable that the foamed particles are based on a thermoplastic polyurethane produced by using polytetrahydrofuran. The molar mass of the polytetrahydrofuran used is preferably from 600 to 2500 g/mol. In another preferred embodiment, a polyester polyalcohol with molar mass of from 500 to 2500 g/mol, preferably from 600 to 900 g/mol, is used to produce the foamed particles.

A hybrid material comprising a matrix of polyurethane and foamed particles of thermoplastic polyurethane comprised therein, and production thereof, is described by way of example in WO 2008087078. This material can by way of example be obtained by mixing (a) polyisocyanates with (b) compounds having hydrogen atoms reactive toward isocyanates, and with (c') expandable particles of thermoplastic polyurethane which comprise blowing agents in dispersed or dissolved form, and with (d) blowing agents, and also, if appropriate, with (e) chain extenders and/or crosslinking agents, and with (f) catalysts, and with (g) further additives, to give a reaction mixture, and reacting to give the hybrid material, where the reaction takes place under conditions which lead to expansion of the expandable particles (c').

In one preferred embodiment of the invention, the hybrid material of the invention is produced by mixing (a) polyisocyanates with (b) compounds having hydrogen atoms reactive toward isocyanates, and with (c') expandable particles of thermoplastic polyurethane which comprise blowing agents in dispersed or dissolved form, and with (d) blowing agents, and also, if appropriate, with (e) chain extenders and/or crosslinking agents, (f) catalysts, and (g) further additives, to give a reaction mixture, and reacting to give the hybrid material, where the reaction takes place under conditions which lead to the expansion of the expandable particles (c').

In one preferred embodiment of the invention, the hybrid material of the invention is produced by mixing (a) polyisocyanates with (b) compounds having hydrogen atoms reactive toward isocyanates, and with (c") expanded particles of thermoplastic polyurethane, and with (d) blowing agents, and also, if appropriate, with (e) chain extenders and/or crosslinking agents, and with (f) catalysts, and with (g) further additives, to give a reaction mixture, and reacting to give the hybrid material.

The hybrid materials of the invention feature very good adhesion of the matrix material to the expanded particles of thermoplastic polyurethane. A hybrid material of the invention does not tear at the interface of matrix material with expanded particles of thermoplastic polyurethane.

Shoe soles of the invention moreover exhibit improved properties in comparison with shoe soles which comprise conventional airbags instead of the foamed particles of thermoplastic polyurethane. By way of example, for identical volume of airbag and foamed particles of thermoplastic polyurethane, damping properties are comparable whereas the adhesion of the insert to the matrix material has been markedly improved in the case of the foamed particles. Bending force to ISO 178 is also markedly smaller for a shoe sole of the invention than for a conventional model with airbag, and this is advantageous for the natural rolling movement of the foot.

The puncture resistance of the foamed particles represents another substantial advantage in comparison with a conventional airbag made of welded TPU foil. If a sharp object, such as a thorn or nail, penetrates into the airbag of a conventional shoe with a welded airbag, a conventional airbag loses its gas filling and becomes useless, since the damping properties achieved via compression of the included gas are lost. A shoe sole of the invention with foamed particles of thermoplastic polyurethane has a microcellular, closed-cell foam instead of a conventional airbag, and the foam does not lose its damping and load-bearing properties even after damage or puncture.

Another advantage is that no substantial changes are required in the production process when comparison is made with a process for producing shoe soles with conventional "airbag".

The invention is illustrated by the examples below:
Production of the Expandable Particles:

Starting from one mole of a polyester polyol with a number-average molar mass of 800 g/mol, based on adipic acid and 1,4-butanediol, granules of a thermoplastic polyurethane (TPU A) with average particle weight about 30 mg were produced via reaction with 0.44 mol of 1,4-butanediol and 1.44 mol of 4,4'-MDI. Starting from one mole of polytetrahydrofuran with a number-average molar mass of 1333 g/mol, granules of a thermoplastic polyurethane (TPU B) with average particle weight likewise about 30 mg were produced analogously via reaction with 0.97 mol of 1,4-butanediol and 1.97 mol of 4,4'-MDI.

The following were respectively successively mixed, with agitation, in an autoclave: 100 parts by weight of the thermoplastic polyurethane A (TPU A) and B (TPU B) with respectively 250 parts of water, 6.7 parts of tricalcium phosphate, and also 20 parts of n-butane, and heated to the temperature stated in table 1. The contents of the pressure vessel were then discharged via a basal valve and depressurized, where the pressure within the tank was kept constant via further introduction under pressure of nitrogen or, respectively, the blowing agent used. The foam particles were freed from the adherent residues of auxiliaries via washing with nitric acid and water, and were dried with air at 50° C.

Table 1 gives the impregnation conditions and the resultant bulk densities of the expanded particles.

TABLE 1

| TPU | n-Butane [pts. by wt.] | Temperature [° C.] | Bulk density [g/L] |
|---|---|---|---|
| TPU A | 20 | 112 | 300 |
| TPU A | 20 | 114 | 170 |
| TPU B | 20 | 119 | 240 |
| TPU B | 20 | 120 | 190 |
| TPU B | 20 | 122 | 140 |
| TPU B | 20 | 125 | 120 |

Production of a Hybrid Material in the Form of Integral Foam (Example 1)

The foamed particles produced from thermoplastic polyurethane with a bulk density of 120 g/L were adhesive-bonded by using a two component polyurethane binder to give an insert measuring 8 cm×5 cm×1 cm with a density of 175 g/L. For this, the foamed particles produced were placed in a mold and adhesive-bonded with 15 parts by weight of a 2-component polyurethane system as binder. The adhesive-bonded particles were placed into the heel region of an aluminum mold temperature-controlled to 50° C., for producing shoe soles of length 29 cm. 80 g of reaction mixture of table 2 were then charged to the mold. This matrix formulation is a conventional polyurethane mixture for producing integral foams of average density. The mold is sealed, and the molding is demolded after 5 min. In the comparative example, the procedure was analogous, but a commercially available airbag made of a thick TPU foil produced by Nike measuring 8 cm×5 cm×1 cm was inserted into the mold instead of the insert made of adhesive-bonded, foamed particles.

Table 2 collates the constitution of the foams and also their mechanical properties:

TABLE 2

Constitution and mechanical properties of hybrid foams (1) and of conventional low-density foams (comp 1)

| | Example 1 | comp 1 |
|---|---|---|
| Polyol 1 | 75.65 | 75.65 |
| Polyol 2 | 10.0 | 10.0 |
| Chain extender | 10.5 | 10.5 |
| Water | 0.85 | 0.85 |
| Amine cat. | 1.0 | 1.0 |
| Cell regulator | 2.0 | 2.0 |
| ExTPU | yes | no- |
| B: iso comp. | | |
| Iso 1 | 119.7 | 119.7 |
| Index | 96 | 96 |
| Mechanical properties | | |
| Matrix density [g/L] | 360 | 360 |
| Hardness [Asker C] | 59-61 | 59-61 |
| Split tear [N/mm] | 3.2 | 3.2 |
| Rebound resilience (without/with insert) [%] | 28/59 | 28/40 |
| Bending force (heel part, insert + shoe sole) [N] | 94.45 | 142.55 |

The isocyanate components used comprised isocyanate prepolymers based on MDI and polyetherol mixtures with NCO content of 19.0% (iso 1).

Polyol 1 is a polyesterol based on adipic acid, monethylene glycol and diethylene glycol with an OH number of 56 mg KOH/g. Polyol 2 is a polymerpolyesterol with a solid content of 30 wt.-%. The chain extender is composed of a mixture of 1,4-butanediol and ethylene glycol. The amine catalyst used comprised a mixture of tertiary amines in glycols. The cell regulator is a surfactant silicone polymer sold under the trademark Elastopan® CS7359/100.

Tear-propagation resistance (Split tear) was determined to ASTM D3574F.

Rebound resilience was determined to DIN 53512.

As can be seen from the examples the use of a TPU insert compared to the traditional air bag results in a decreased bending force and higher rebound resilience.

The invention claimed is:

1. A process for producing a shoe sole, the shoe sole comprising a hybrid material which comprises a polyurethane foam as a matrix material and an inlay component of expanded particles of a thermoplastic polyurethane;
   wherein the shoe sole does not comprise foamed particles of thermoplastic polyurethane in a region of at least 0.2 cm from an exterior edge of the shoe sole;
   the process comprising:
   preparing an inlay form by joining the expanded particles of a thermoplastic polyurethane in an amount and size of the desired inlay by placing them into a mould of the desired inlay size and joining them within the mould to obtain a prepared inlay form or by joining them in larger amounts to form large aggregates or sheets which are then cut to inlays of the desired size to obtain a prepared inlay form;
   preparing the shoe sole by placing the prepared inlay form in a shoe sole mold such that an edge of the inlay form is 0.2 cm or more from an edge of the shoe sole mold;
   embedding the inlay form within a reaction mixture in the shoe sole mold; and
   reacting the reaction mixture to form the matrix in the shoe sole mold; obtain the shoe sole, and
   removing the matrix with embedded inlay from the mold to obtain the shoe sole;
   wherein the expanded particles of the inlay component are bonded with adhesives or with thermal adhesive bonding, and the reaction mixture comprises: a polyisocyanate; a compound having a hydrogen atom reactive toward isocyanate, and optionally at least one of a chain extender, a crosslinking agent, a catalyst, a blowing agent, and a further additive.

2. The process according to claim 1, wherein the inlay is prepared by placing expanded particles of a thermoplastic polyurethane into a mould of the desired size and joining expanded particles of a thermoplastic polyurethane within the mould.

3. The process according to claim 1, wherein the inlay is prepared by joining expanded particles of a thermoplastic polyurethane to form large aggregates, which are cut to inlays of the desired size.

4. The process according to claim 1, wherein the shoe sole is an integral polyurethane foam of the matrix material and the inlay.

5. The process according to claim 1, wherein the expanded foamed particles of thermoplastic polyurethane of the inlay have a compact surface skin.

6. The process according to claim 1, wherein a density of the expanded foamed particles of thermoplastic polyurethane of the inlay is from 10 to 300 g/L.

7. A shoe sole obtained by a process according to claim 1.

8. The shoe sole according to claim 7, wherein a density of the matrix material is from 100 to 800 g/L.

* * * * *

UNITED STATES PATENT AND TRADEMARK OFFICE
CERTIFICATE OF CORRECTION

PATENT NO. : 10,165,823 B2
APPLICATION NO. : 15/834725
DATED : January 1, 2019
INVENTOR(S) : Frank Prissok et al.

It is certified that error appears in the above-identified patent and that said Letters Patent is hereby corrected as shown below:

In the Specification

In Column 10, Line 48, delete "800 g/I," and insert -- 800 g/L, --, therefor.

In Column 10, Line 48, delete "150 to 600 g/I," and insert -- 150 to 600 g/L, --, therefor.

In Column 14, Lines 4-5, delete "monethylene" and insert -- monoethylene --, therefor.

In Column 8, Line 47, delete "siloxane-oxalkylene" and insert -- siloxane-oxyalkylene --, therefor.

Signed and Sealed this
Twenty-first Day of April, 2020

Andrei Iancu
*Director of the United States Patent and Trademark Office*